(12) United States Patent
Li

(10) Patent No.: US 7,825,785 B2
(45) Date of Patent: Nov. 2, 2010

(54) VEHICLE BACKUP DETECTOR THAT INDICATES A DISTANCE FROM AN OBSTRUCTION

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 228 days.

(21) Appl. No.: 12/151,359

(22) Filed: May 6, 2008

(65) Prior Publication Data

US 2009/0278673 A1 Nov. 12, 2009

(51) Int. Cl.
*B60Q 1/00* (2006.01)
*H04N 13/02* (2006.01)
*G08G 1/16* (2006.01)

(52) U.S. Cl. .................... 340/435; 340/436; 348/47; 348/48; 701/301

(58) Field of Classification Search .................. None
See application file for complete search history.

(56) References Cited

U.S. PATENT DOCUMENTS 3,897,150 A * 7/1975 Bridges et al. ............ 356/5.04
4,809,178 A * 2/1989 Ninomiya et al. ........... 701/200
2009/0073081 A1* 3/2009 Kakizaki ...................... 345/7

\* cited by examiner

*Primary Examiner*—Julie Lieu

(57) ABSTRACT

A vehicle backup detector that indicates a distance from an obstruction comprises multiple ultrasonic transducers, a central processing unit, memory, a video camera, a graphics superimposing module and a display device. The ultrasonic transducers emit and receive ultrasonic waves. The central processing unit defines multiple sensing coordinates in a sensing area in which ultrasonic waves are transmitted and calculates a position of the obstruction. The memory is divided into multiple storing fields corresponding to the sensing coordinates to store obstruction data based on the position of the obstruction. A video camera records images behind the vehicle. A graphics superimposing module superimposes graphical images representing ultrasonic waves on the images recorded by the video camera based on the storing fields where no obstruction data are stored. The display device displays images behind the vehicle with the ultrasonic wave images.

10 Claims, 15 Drawing Sheets

VEHICLE BACKUP DETECTOR THAT INDICATES A DISTANCE FROM AN OBSTRUCTION

BACKGROUND OF THE INVENTION

1. Field of the Invention

The present invention relates to a backup detector, and more particularly to a vehicle backup detector that indicates a distance from an obstruction.

2. Description of Related Art

Among quickly developing technologies, backup detectors for automobiles are becoming widely used to assist drivers in backing cars safely. The backup detector comprises multiple ultrasonic transducers and an alerting device. When the car is in reverse, the ultrasonic transducers in the backup detector emit ultrasonic waves. Reflected ultrasonic waves are detected by the transducers when the ultrasonic waves are reflected by an obstruction. The alerting device emits an audible warning when an obstruction is detected.

A better backup detector further comprises a video camera and a liquid crystal display (LCD). The video camera records images behind the car, and the LCD displays the images. Therefore, the alerting device and the LCD provide twice as much assistant information to the driver when the car is backing up. Furthermore, another better backup detector calculates distance between the rear of the car and the obstruction based on the travel time of a reflected ultrasonic wave between transducer emitting the ultrasonic wave and receiving the reflected ultrasonic wave. The LCD further displays a numeric distance between the rear of the car and the obstruction to provide more assistant information.

However, the backup detector is often unable to determine whether the obstruction is near the right rear or the left rear of the car. Furthermore, a long time is often required for the driver to determine the correct position of the obstruction because the driver can only see the numeric distance displayed on the LCD.

To overcome the shortcomings, the present invention provides a vehicle backup detector that indicates a distance from an obstruction to mitigate or obviate the aforementioned problems.

SUMMARY OF THE INVENTION

The main objective of the invention is to provide a vehicle backup detector that indicates a distance from an obstruction.

The vehicle backup detector in accordance with the present invention comprises multiple ultrasonic transducers, a central processing unit, memory, a video camera, a graphics superimposing module and a display device. The ultrasonic transducers emit and receive ultrasonic waves. The central processing unit defines multiple coordinates in a sensing area in which ultrasonic waves are transmitted and calculates a position of the obstruction. The memory is divided into multiple fields corresponding to the sensing coordinates to store obstruction data based on the position of the obstruction. The video camera records images behind the vehicle. The graphics superimposing module superimposes graphical images representing ultrasonic waves on the images recorded and transmitted by the video camera based on the storing fields where no obstruction data are stored. The display device displays images behind the vehicle with the ultrasonic wave images.

Other objectives, advantages and novel features of the invention will become more apparent from the following detailed description when taken in conjunction with the accompanying drawings.

DETAILED DESCRIPTION OF PREFERRED EMBODIMENT

Figure 1:
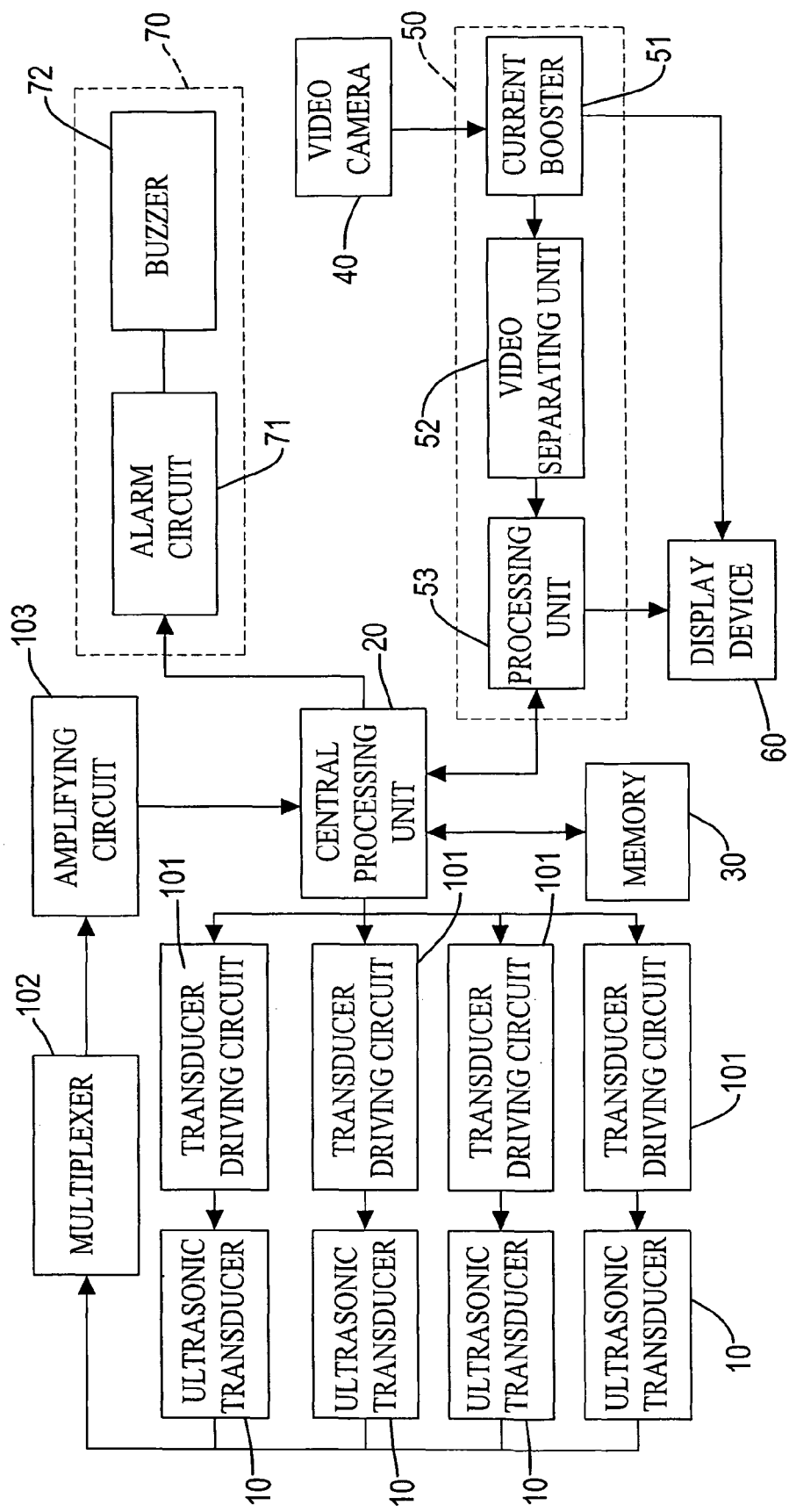
FIG. 1 is a functional block diagram of a vehicle backup detector in accordance with the present invention.

With reference to FIG. 1, a vehicle backup detector that indicates a distance from an obstruction in accordance with the present invention comprises multiple ultrasonic transducers (10), a central processing unit (20), multiple optional transducer driving circuits (101), an optional multiplexer (102), an optional amplifying circuit (103), memory (30), a video camera (40), a graphics superimposing module (50), a display device (60) and an optional alarm module (70).

Figure 2:
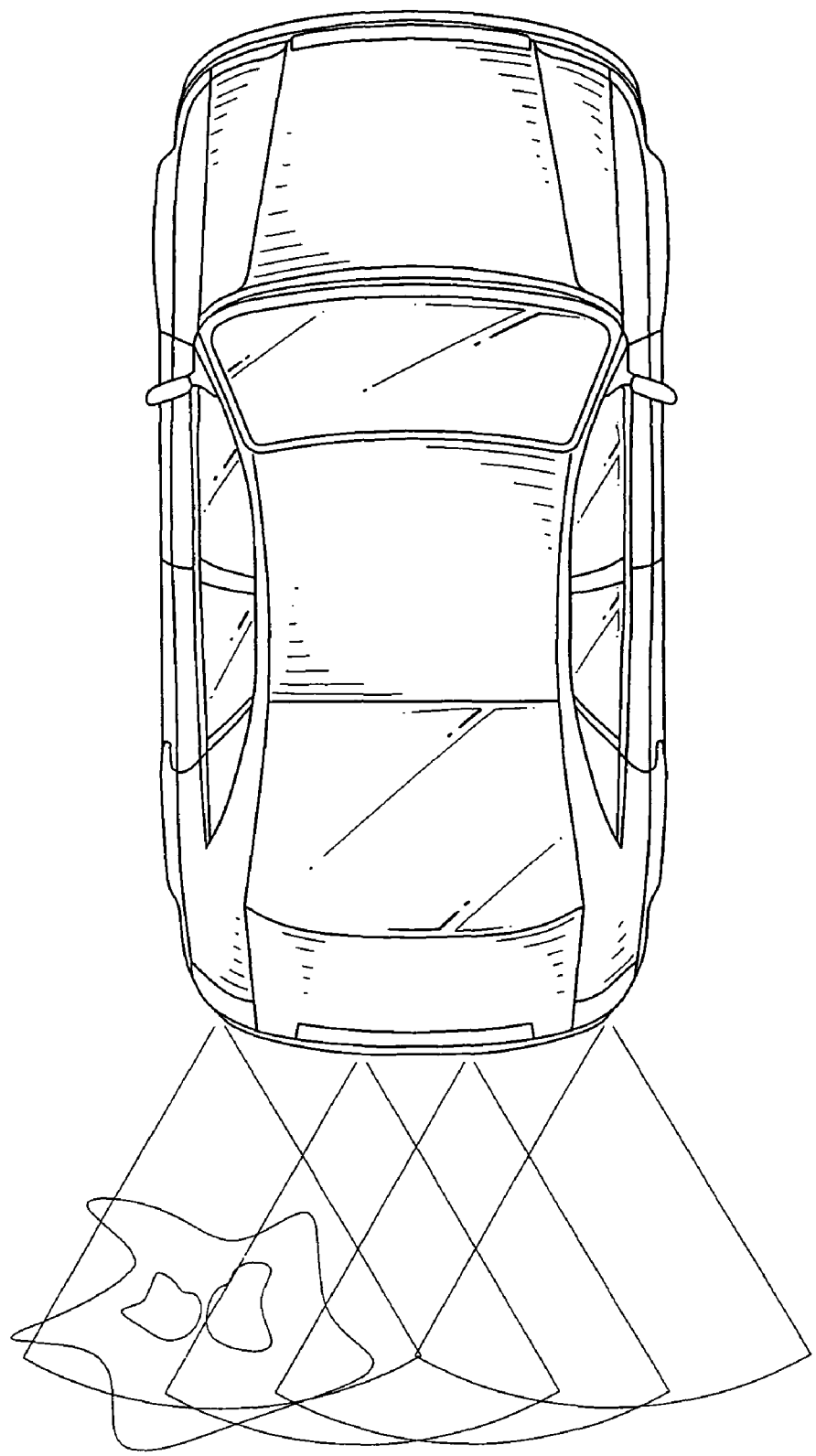
FIG. 2 is a top view of a sensing area of multiple ultrasonic transducers in a vehicle backup detector in FIG. 1 mounted on a vehicle.

With further reference to FIG. 2, the ultrasonic transducers (10) emit and receive ultrasonic waves. The ultrasonic waves emitted by the ultrasonic transducers (10) are reflected by an obstruction, and the ultrasonic transducers (10) receive reflected ultrasonic waves. Each ultrasonic transducer (10) outputs a signal when a reflected ultrasonic wave is received.

Figure 3A:
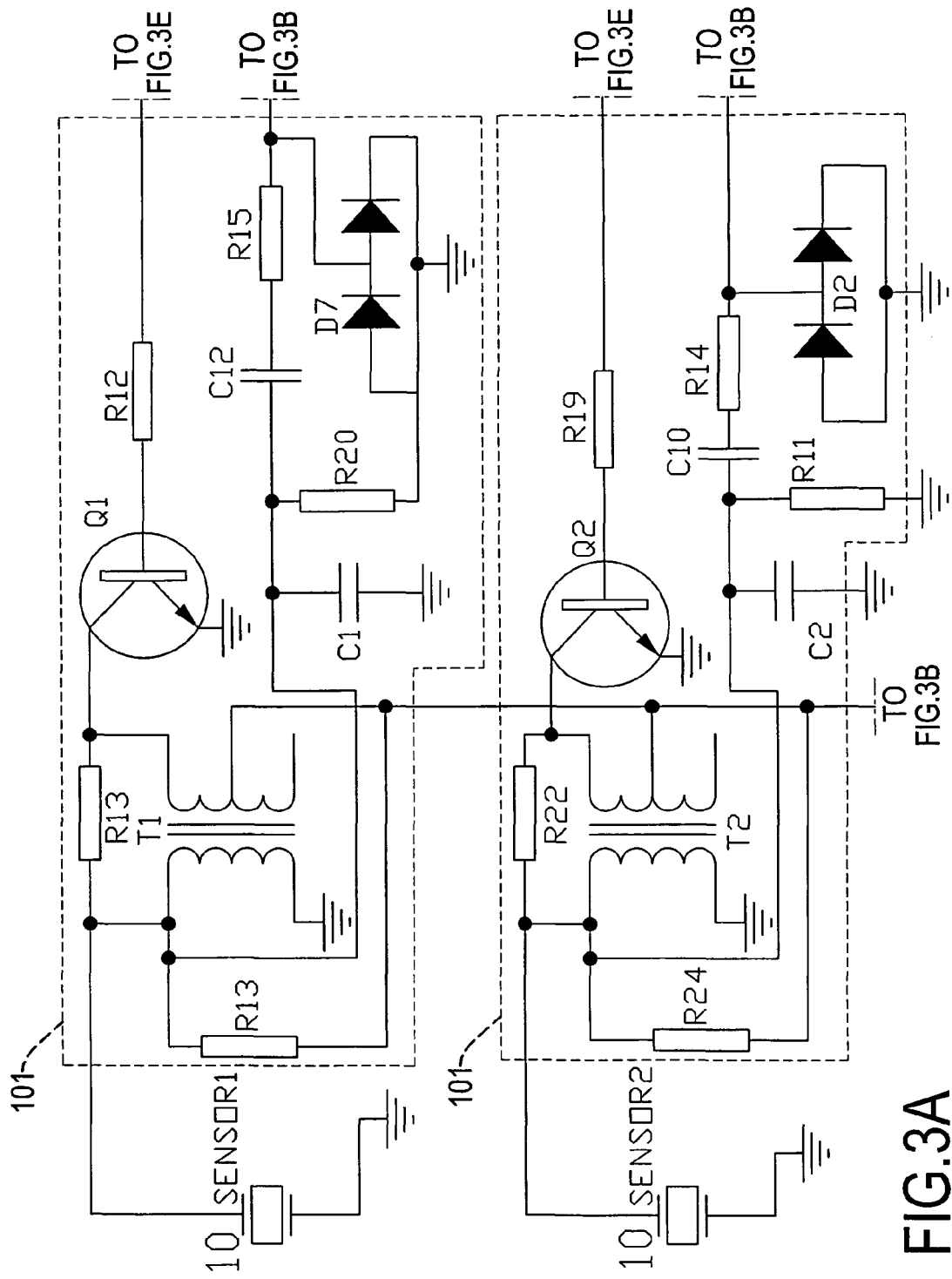
FIG. 3A is a circuit diagram of ultrasonic transducers and transducer driving circuits of the vehicle backup detector in FIG. 1.
Figure 3B:
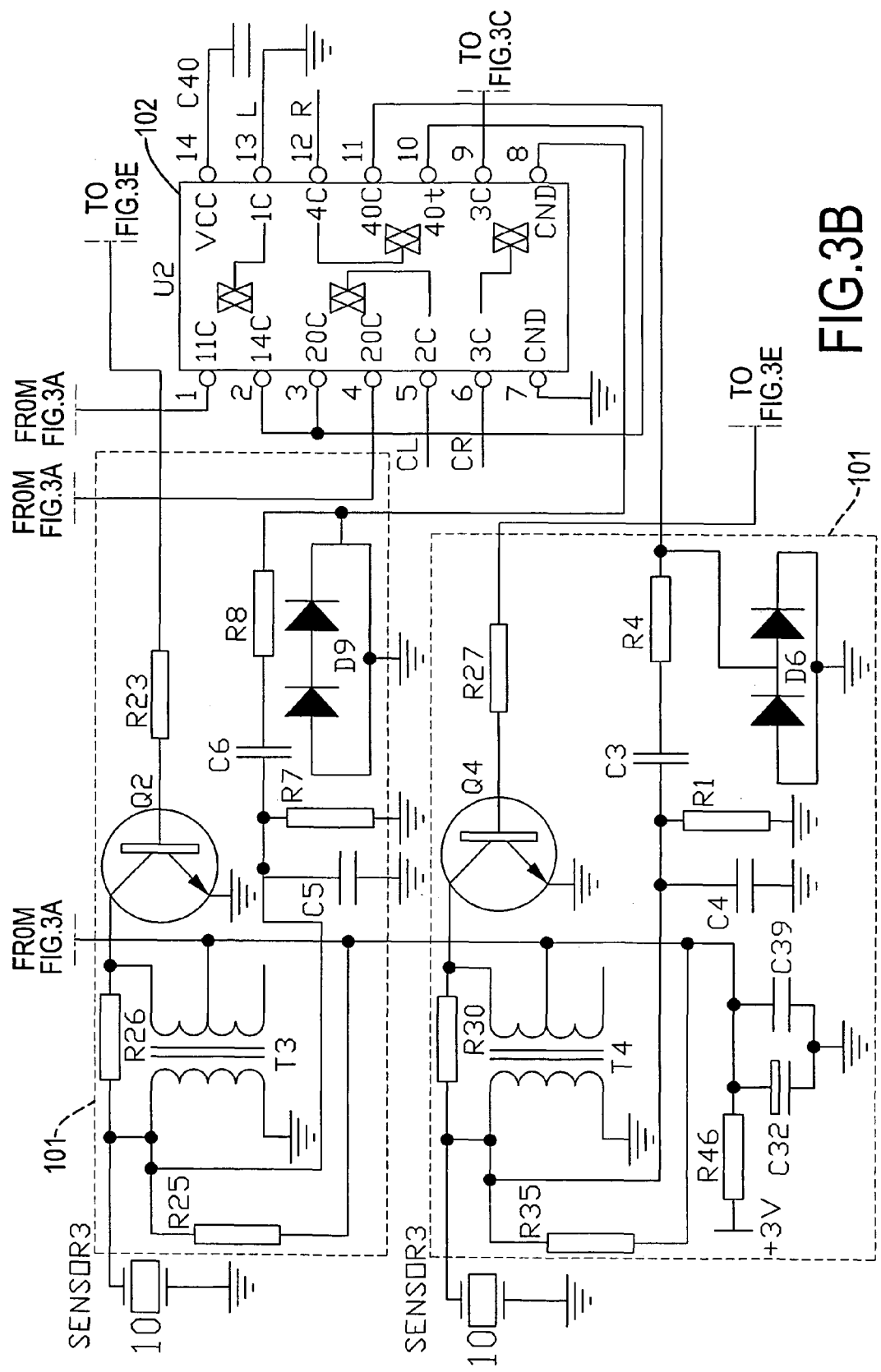
FIG. 3B is a circuit diagram of ultrasonic transducers, transducer driving circuits and a multiplexer of the vehicle backup detector in FIG. 1.
Figure 3C:
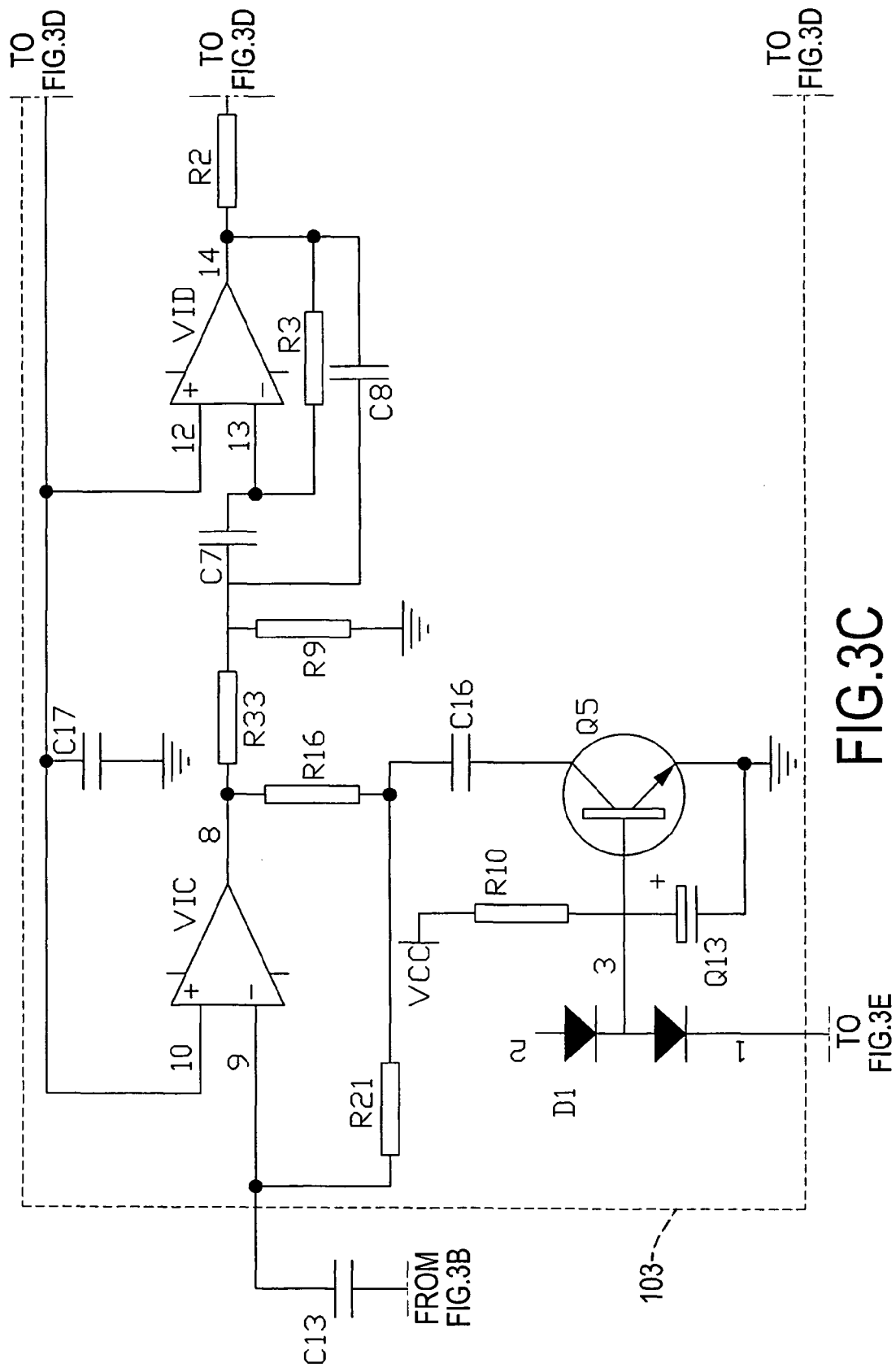
FIG. 3C is a circuit diagram of part of an amplifying circuit of the vehicle backup detector in FIG. 1.
Figure 3D:
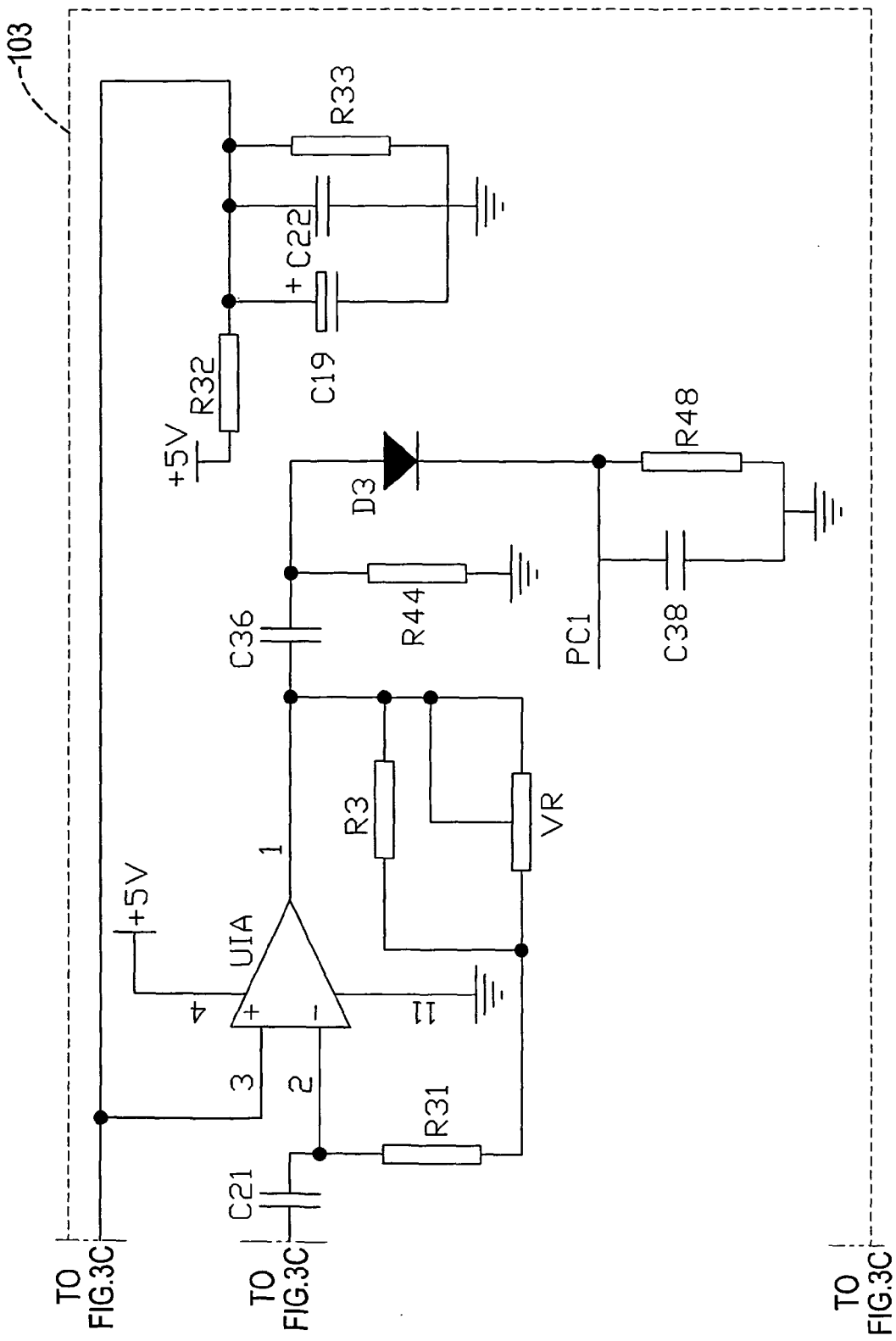
FIG. 3D is a circuit diagram of another part of the amplifying circuit of the vehicle backup detector in FIG. 1 connected to the amplifying circuit in FIG. 3C.
Figure 3E:
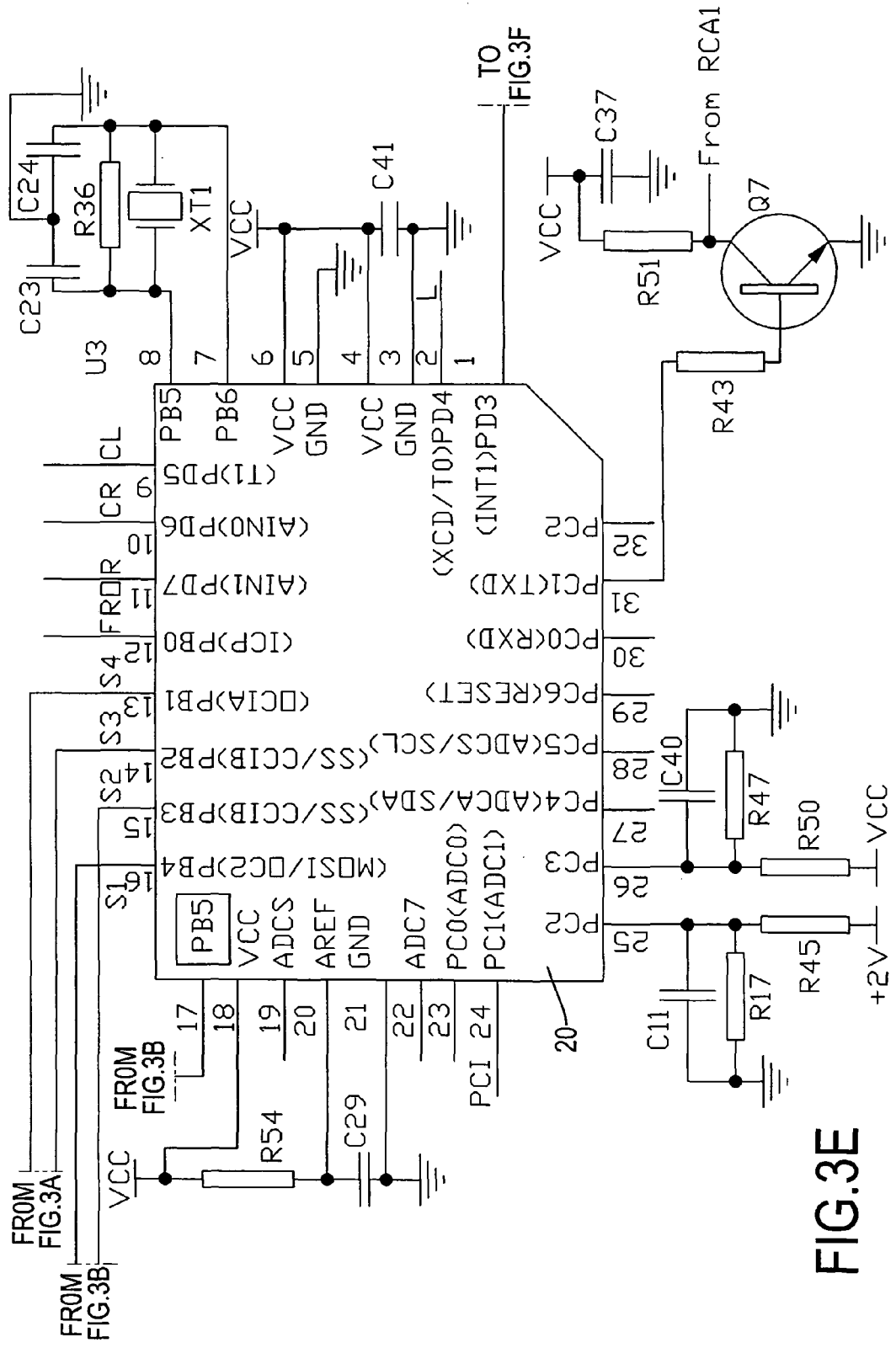
FIG. 3E is a circuit diagram of a central processing unit of the vehicle backup detector in FIG. 1.

With further reference to FIG. 3E, the central processing unit (20) is connected to the ultrasonic transducers (10), switches the ultrasonic transducers (10) between emitting and receiving modes, defines multiple sensing coordinates in a sensing area in which the ultrasonic waves are transmitted, calculates a distance between the ultrasonic transducers (10) and the obstruction based on a time delay between the ultrasonic transducers (10) being emitted and received, calculates a position of the obstruction and stores the position in corresponding coordinates in the sensing area. Furthermore, the central processing unit (20) may be an ATMega8 microprocessor having a 1 kb random-access memory (RAM).

The transducer driving circuits (101) are connected to the central processing unit (20) and respectively to the ultrasonic transducers (10) and are driven by the central processing unit (20) to drive the corresponding ultrasonic transducer (10). With further reference to FIGS. 3A and 3B, the transducer driving circuits (101) respectively comprise pairs of a transformer (T1, T2, T3, T4) and a transistor (Q1, Q2, Q3, Q4). Each transistor (Q1, Q2, Q3, Q4) has a base terminal, a collector terminal and an emitter terminal. The base terminal of each transistor (Q1, Q2, Q3, Q4) is connected to the central processing unit (20). The collector terminal of each transistor (Q1, Q2, Q3, Q4) is connected to the corresponding transformer (T1, T2, T3, T4) and the corresponding ultrasonic transducer (10).

The multiplexer (102) is connected to the ultrasonic transducers (10) to receive and output the transducer signals in sequence as received.

The amplifying circuit (103) is connected between the central processing unit (20) and the multiplexer (102). When the amplifying circuit (103) receives transducer signals output from the multiplexer (102), the amplifying circuit (103) amplifies the transducer signals and sends the amplified transducer signals to the central processing unit (20). With further reference to FIGS. 3C and 3D, the amplifying circuit (103) may comprise a first operational amplifier (U1C), a band-pass filter and a third operational amplifier (U1A).

The first operational amplifier (U1C) receives and amplifies the transducer signals output from the multiplexer (102) and has a negative input terminal, an output terminal and a positive input terminal. The negative input terminal is connected to the multiplexer (102).

The band-pass filter eliminates noise adjacent to the transducer signals and further comprises a second operational amplifier (U1D), a filter resistor (R5) and a filter capacitor (C8). The second operational amplifier (U1D) has a negative input terminal, an output terminal and a positive input terminal. The negative input terminal of the second operational amplifier (U1D) is connected to the output terminal of the first operational amplifier (U1C). The filter resistor (R5) is connected between the negative input terminal and the output terminal of the second operational amplifier (U1D). The filter capacitor (C8) is also is connected between the negative input terminal and the output terminal of the second operational amplifier (U1D).

The third operational amplifier (U1A) amplifies the transducer signals again, sends the amplified transducer signals to the central processing unit (20) and has a negative input terminal, an output terminal and a positive input terminal. The negative input terminal of the third operational amplifier (U1A) is connected to the output terminal of the second operational amplifier (U1D). The output terminal of the third operational amplifier (U1A) is connected to the central processing unit (20).

The memory (30) is connected to the central processing unit (20) and is divided into multiple storage fields corresponding to the sensing coordinates in the sensing area. Accordingly, the central processing unit (20) stores obstruction data respectively in the corresponding storing fields based on the position of the obstruction. For example, the central processing unit (20) fills the storing field with 1 or 0 depending on whether the coordinate of the storing field corresponds or does not correspond to the coordinate of an obstruction. Furthermore, the memory (30) may be RAM in the central processing unit (20) if the central processing unit (20) is an ATMega8 microprocessor.

The video camera (40) records images behind the vehicle and outputs image signals.

The graphics superimposing module (50) is connected to the central processing unit (20) and the video camera (40) and superimposes graphical images representing ultrasonic waves on images recorded by the video camera (40) where the storing fields of the memory (30) do not contain obstruction data. Furthermore, the graphics superimposing module (50) may comprise a current booster (51), a video separating unit (52) and a processing unit (53).

Figure 4A:
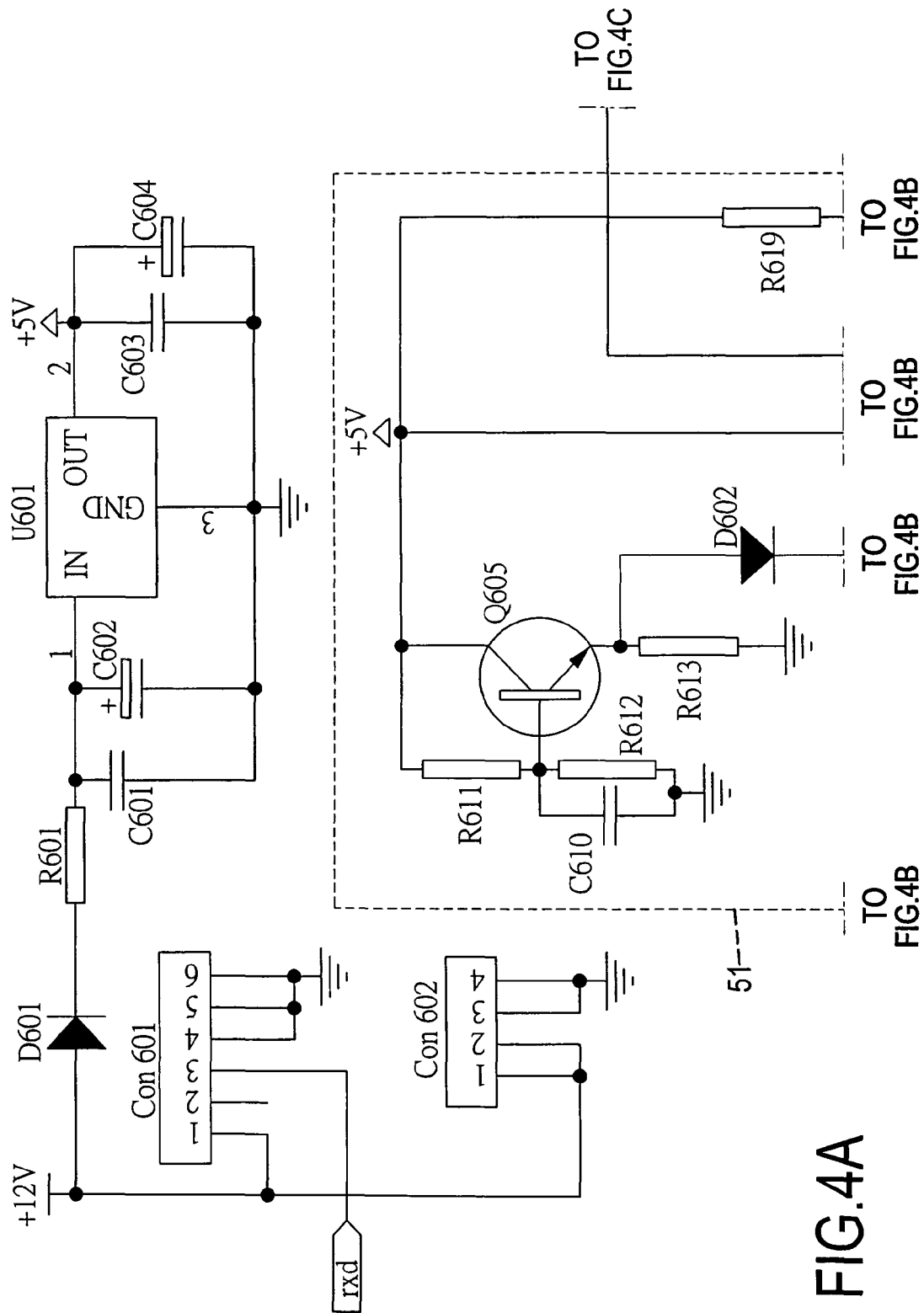
FIG. 4A is a circuit diagram of part of a current booster in FIG. 1.
Figure 4B:
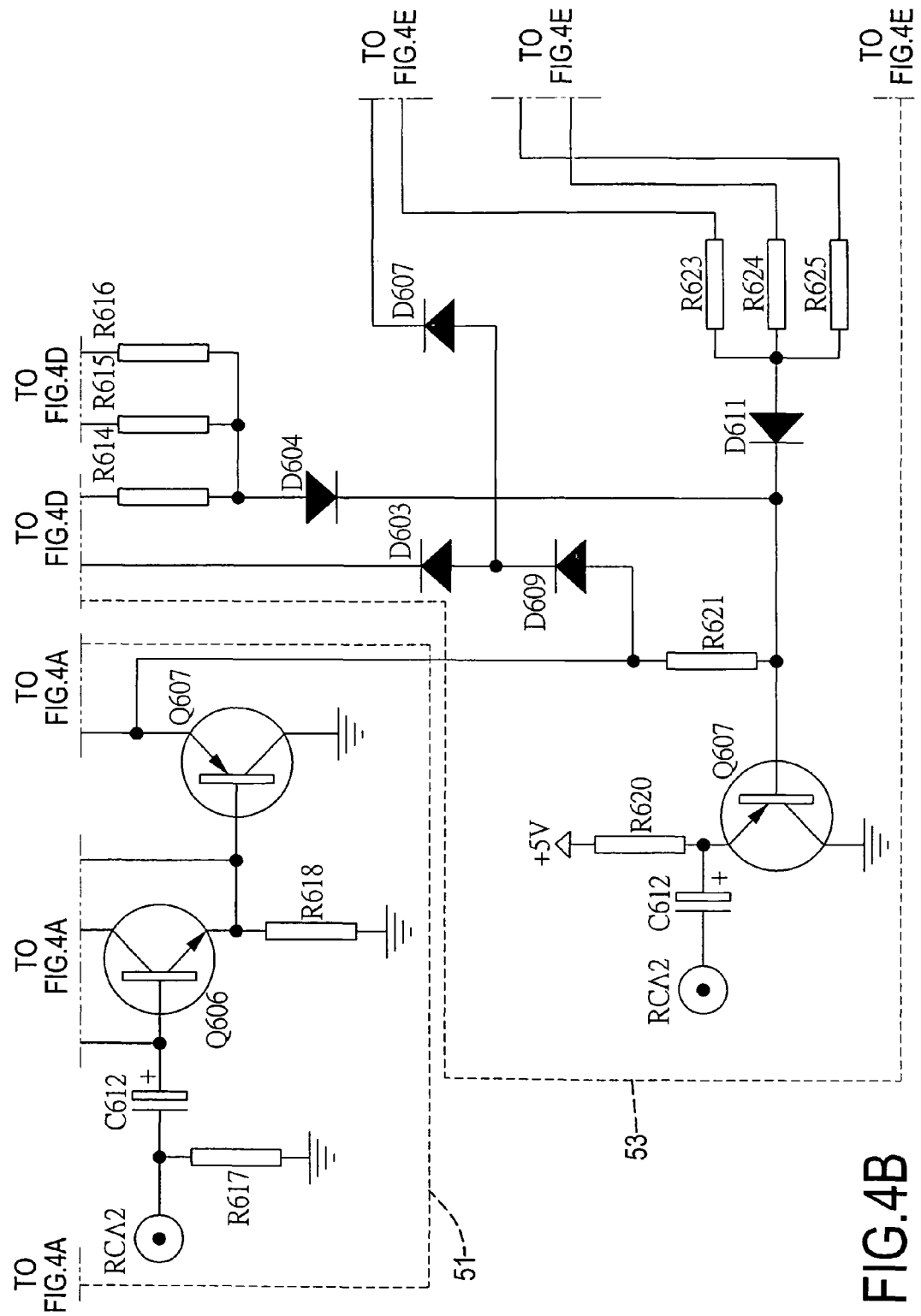
FIG. 4B is a circuit diagram of another part of the current booster and a first part of a processing unit of the vehicle backup detector in FIG. 1.
Figure 4C:
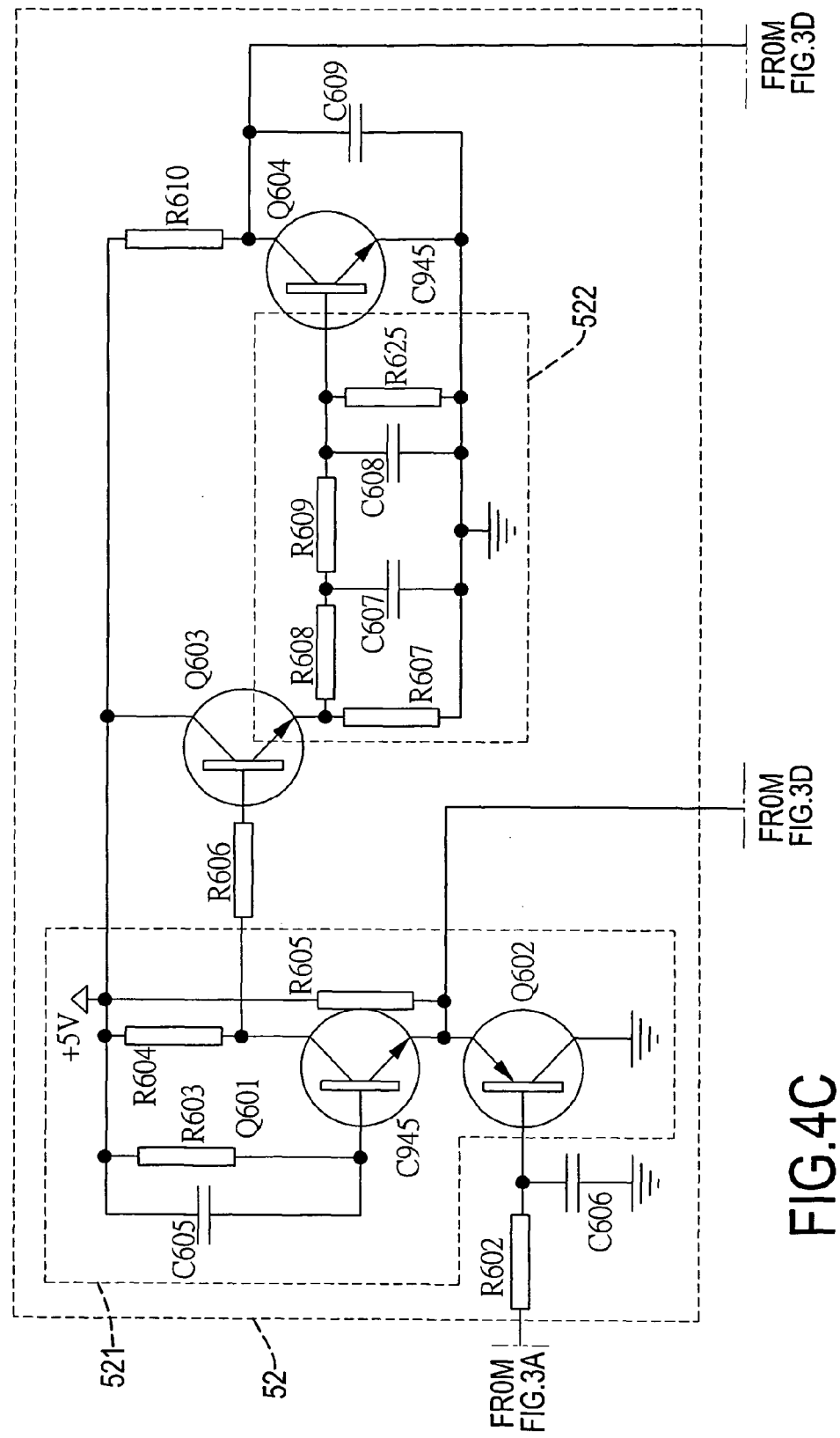
FIG. 4C is a circuit diagram of a video separating unit of the vehicle backup detector in FIG. 1.

With further reference to FIGS. 4A and 4B, the current booster (51) is connected to the video camera (40) to raise the intensity of the image signals and may comprise a first transistor (Q605), a second transistor (606) and a third transistor (Q607). Each of the first, second and third transistors (Q605, Q606, Q607) has a base terminal, a collector terminal and an emitter terminal. The base terminal of the second transistor (Q606) is connected to the video camera (40) and the emitter terminal of the first transistor (Q605). The base terminal of the third transistor (Q607) is connected to the emitter terminal of the second transistor (Q606). The collector terminal of the third transistor (Q607) is interconnected to the collector terminals of the first and second transistors (Q605, Q606).

The video separating unit (52) is connected to the current booster (51) to separate the image signals into row image signals and field image signals and may comprise a first integrating circuit (521) and a second integrating circuit (522).

The first integrating circuit (521) is connected to the current booster (51) to separate the row image signals from the image signals and may comprise two first integrating transistors (Q601, Q602), three first integrating resistors (R603, R604, R605) and a first integrating capacitor (C605).

The second integrating circuit (522) is connected to the first integrating circuit (521) to separate the field image signals from the image signals and may comprise four second integrating resistors (R607, R608, R609, R625) and two second integrating capacitors (C607, C608).

Figure 4D:
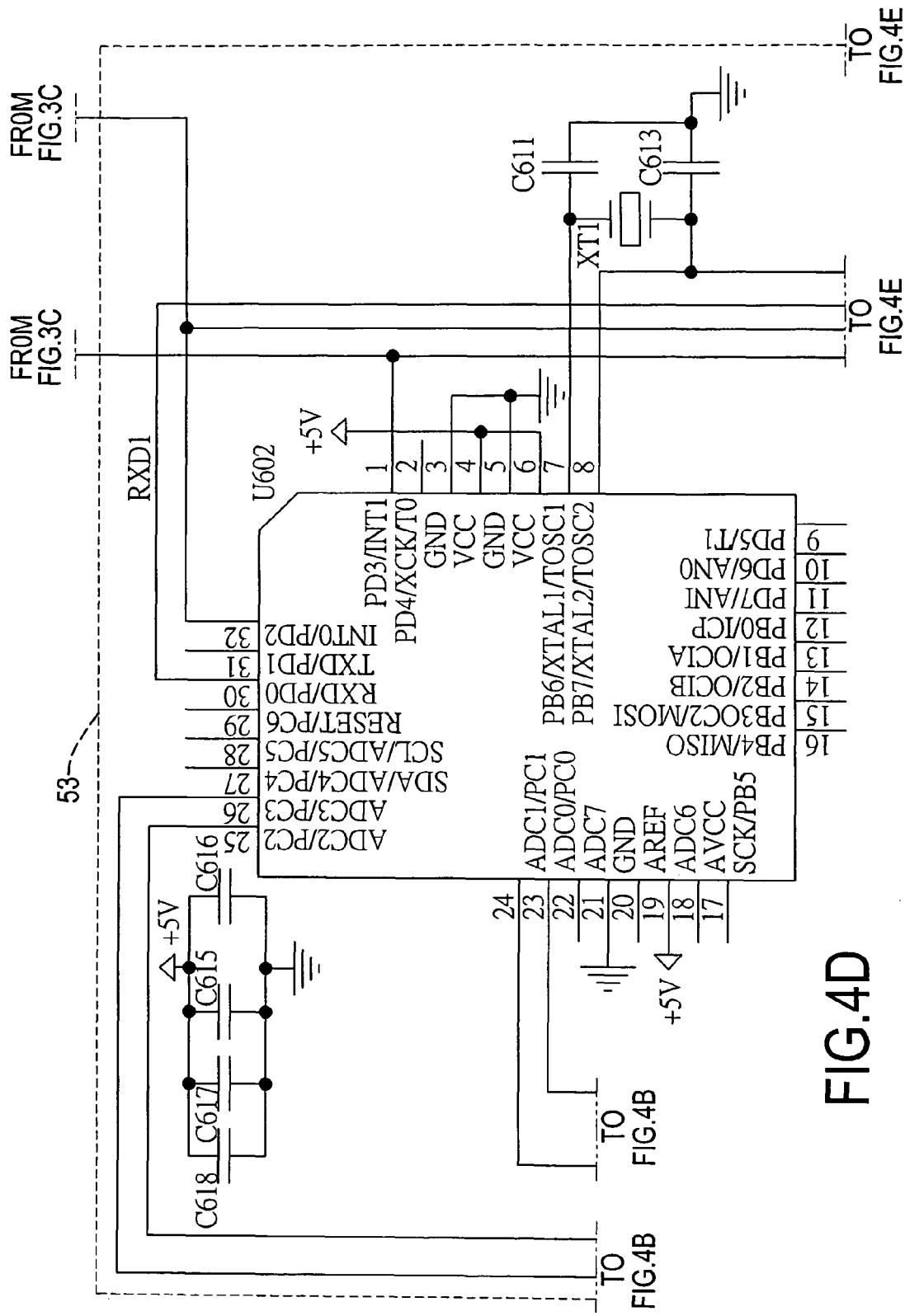
FIG. 4D is a circuit diagram of a second part of the processing unit of the vehicle backup detector in FIG. 1.
Figure 4E:
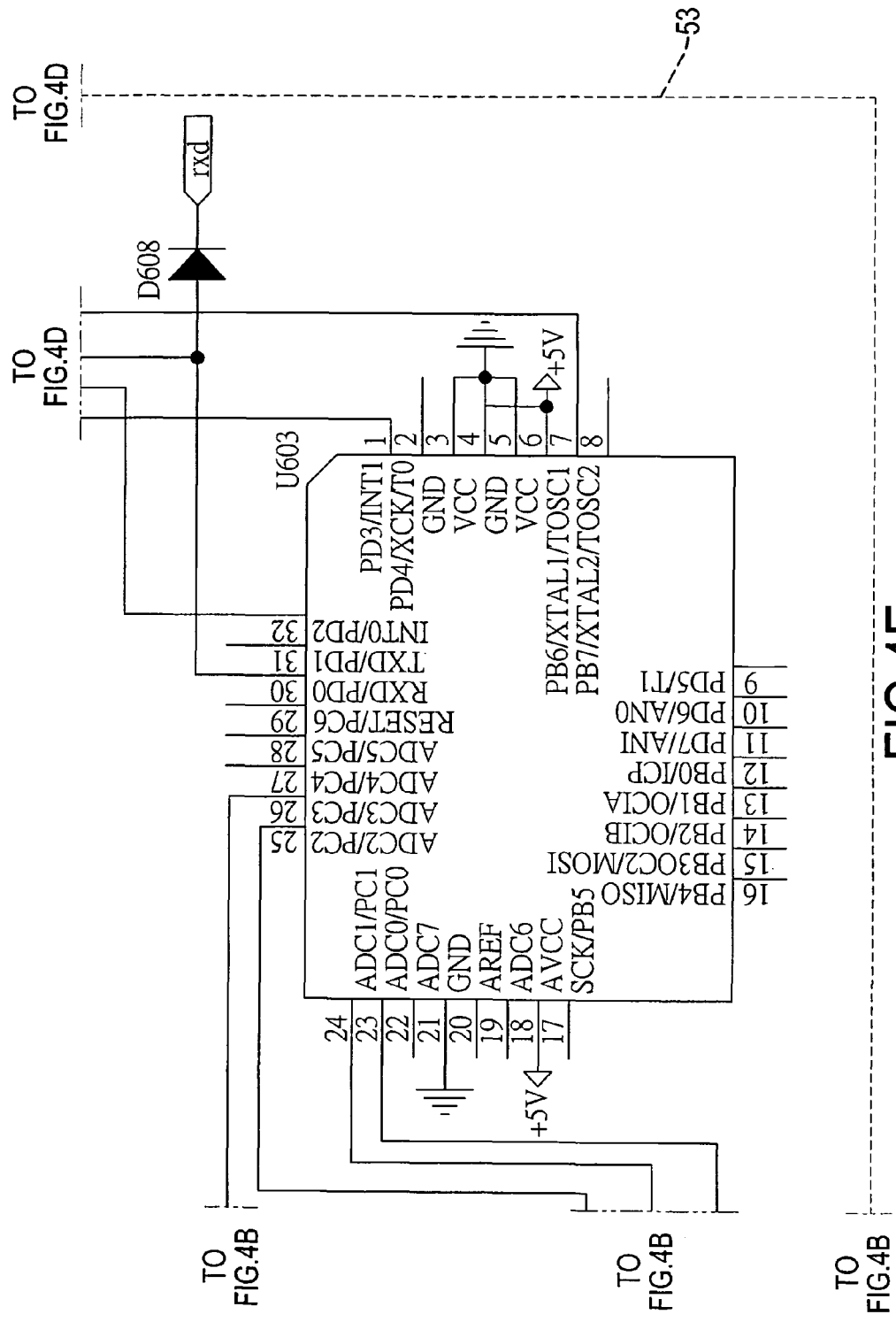
FIG. 4E is a circuit diagram of a third part of the processing unit of the vehicle backup detector in FIG. 1.
Figure 5:
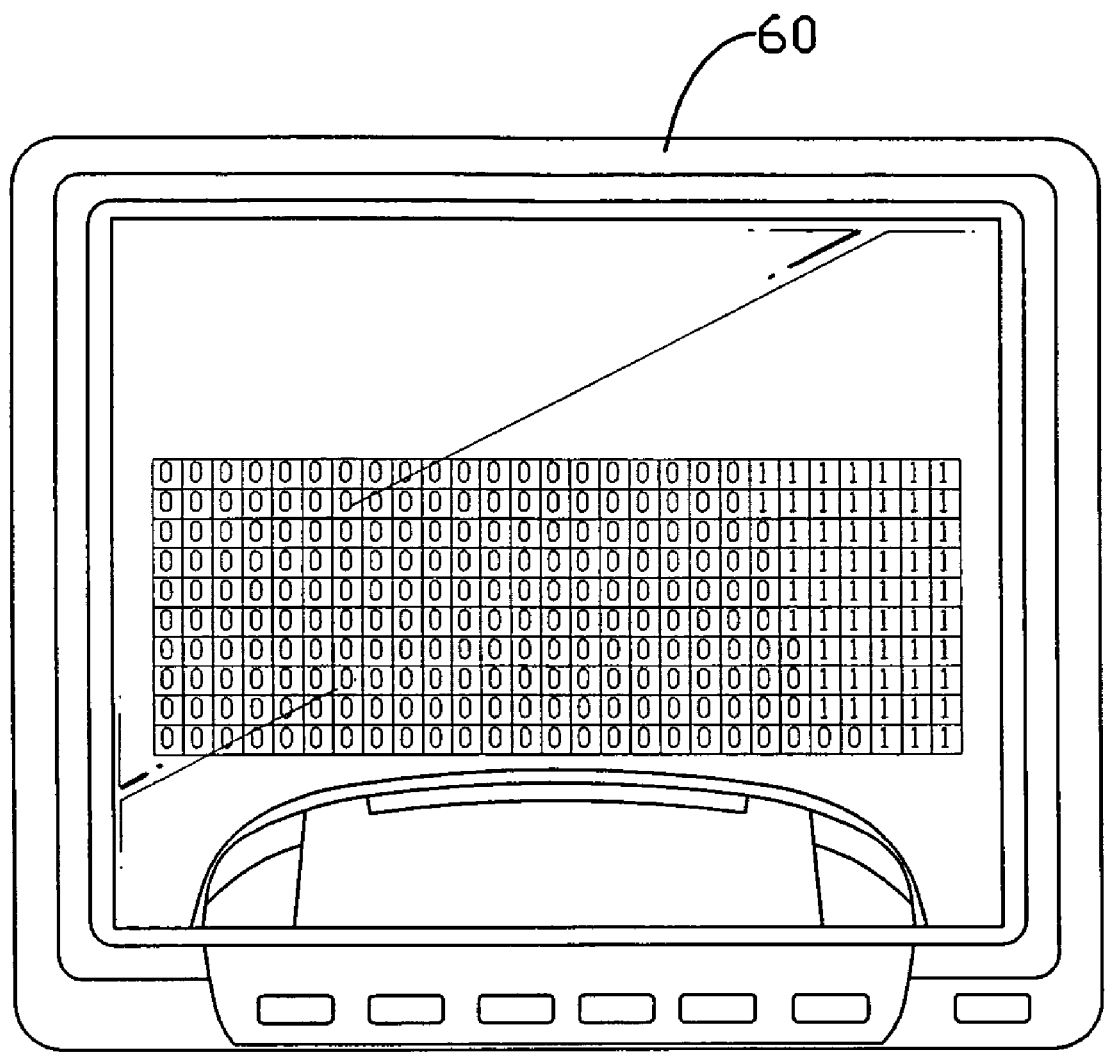
FIG. 5 is a front view of a display device of the vehicle backup detector in FIG. 1 with images recorded by the video camera.
Figure 6:
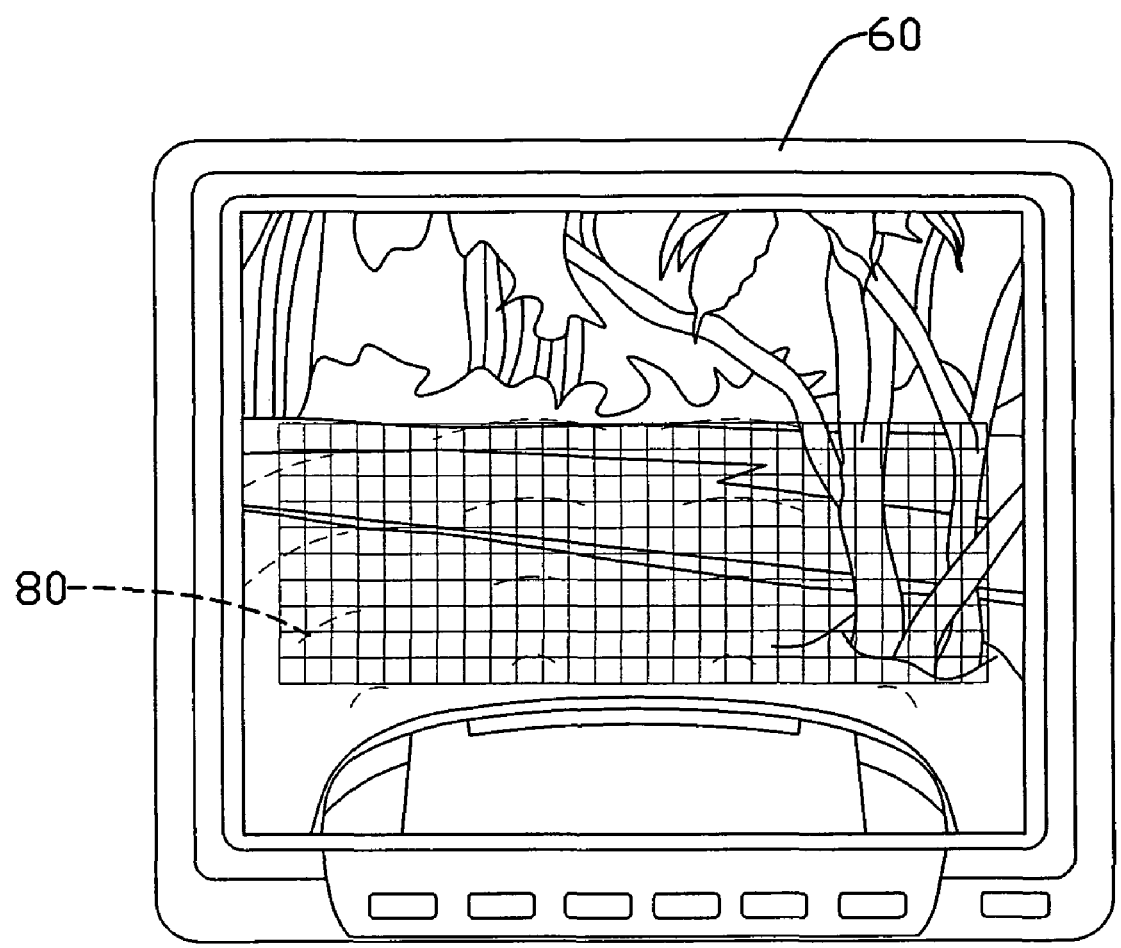
FIG. 6 is a front view of a display device of the vehicle backup detector in FIG. 1 with video images and multiple ultrasonic wave images superimposed on the images in FIG. 5.

The processing unit (53) is connected to the central processing unit (20) and the video separating unit (52), reads data in the storing fields in the memory (30) and receives the row image signals and the field image signals. With further reference to FIGS. 5 and 6, the processing unit (53) uses the row image signals and the field image signals to align and superimpose graphical images (80) representing ultrasonic waves from the coordinates in the storing fields in the memory (30) on the images recorded by the video camera (40). With further reference to FIGS. 4D and 4E, the processing unit (53) may comprise two integrated circuits (U602, U603).

The display device (60) is connected to the video camera (40) and the graphics superimposing module (50) to display images behind the vehicle with the ultrasonic wave images (80).

Figure 3F:
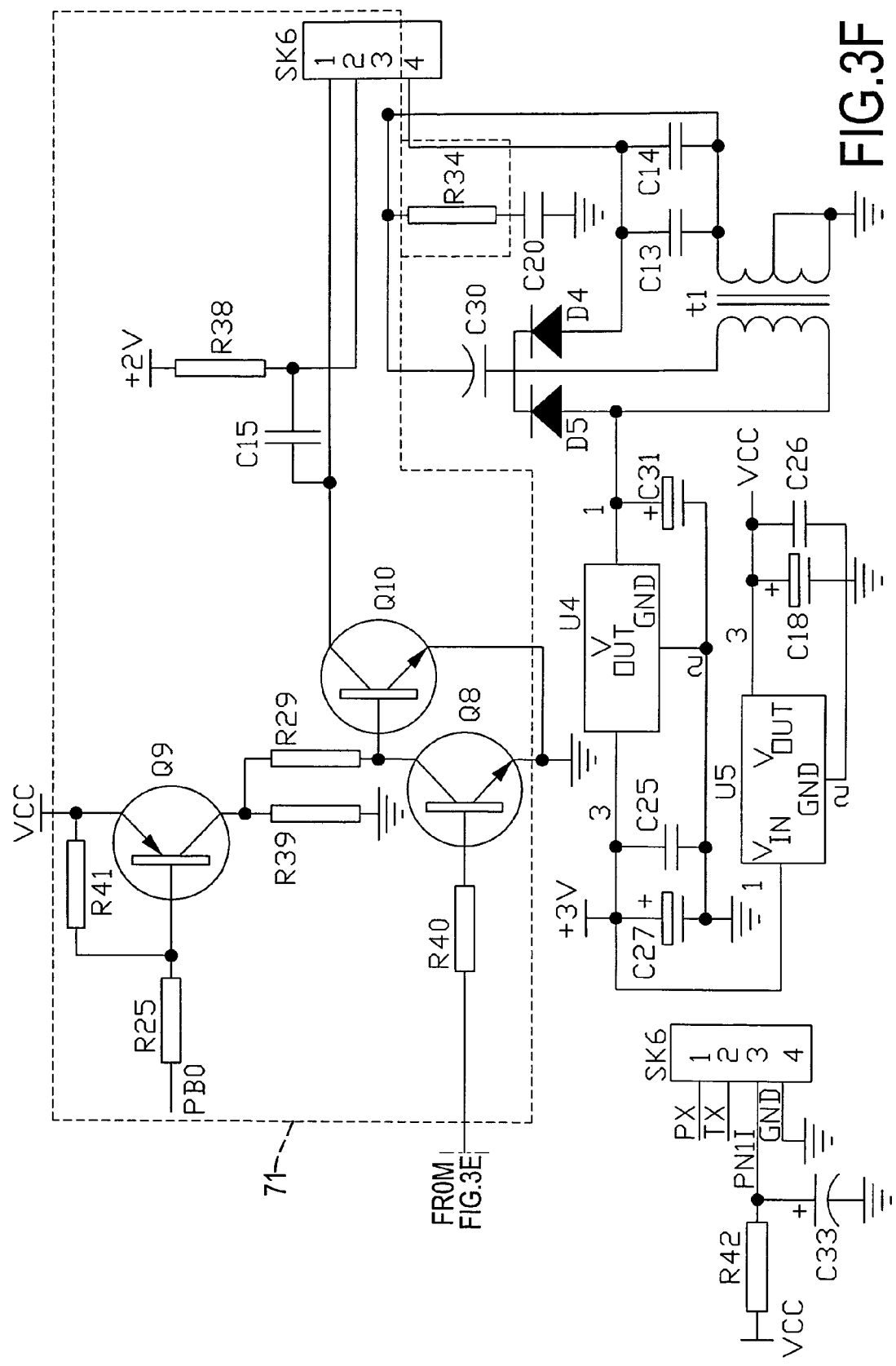
FIG. 3F is a circuit diagram of an alarm circuit of the vehicle backup detector in FIG. 1.

With further reference to FIG. 3F, the alarm module (70) is connected to the central processing unit (20) and comprises an alarm driving circuit (71) and a buzzer (72). The buzzer (72) is connected to the alarm driving circuit (71). When the central processing unit (20) determines that an obstruction is near, the central processing unit (20) activates the buzzer (72) to warn the driver to be careful.

With such a vehicle backup detector, the driver is able to recognize the distance apart from the obstruction instinctively from watching the display device (60) that shows images behind the vehicle with the ultrasonic wave images (80). Furthermore, the alarm module (70) also lets the driver know when to be particularly careful to avoid collision when backing the vehicle.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A vehicle backup detector that indicates a distance from an obstruction comprising
    multiple ultrasonic transducers emitting and receiving ultrasonic waves, and each ultrasonic transducer outputting a signal when a reflected ultrasonic wave is received;
    a central processing unit being connected to the ultrasonic transducers, switching the ultrasonic transducers between emitting and receiving modes, defining multiple sensing coordinates in a sensing area in which the ultrasonic waves are transmitted, calculating a distance between the ultrasonic transducers and the obstruction, calculating a position of the obstruction and storing the position in corresponding coordinates in the sensing area;
    memory being connected to the central processing unit and being divided into multiple storing fields corresponding to the sensing coordinates in the sensing area to allow the central processing unit to store obstruction data respectively in the corresponding storing fields based on the position of the obstruction;
    a video camera capturing images behind the vehicle and outputting image signals;
    a graphics superimposing module being connected to the central processing unit and the video camera and superimposing graphical images representing ultrasonic waves on images recorded by the video camera where the storing fields of the memory do not contain obstruction data; and
    a display device being connected to the video camera and the graphics superimposing module to display images behind the vehicle with the ultrasonic wave images.

2. The vehicle backup detector as claimed in claim 1 further comprising transducer driving circuits connected to the central processing unit and respectively to the ultrasonic transducers and being driven by the central processing unit to drive the corresponding ultrasonic transducer.

3. The vehicle backup detector as claimed in claim 1, wherein the graphics superimposing module comprises a current booster being connected to the video camera to raise the intensity of the image signals;
    a video separating unit being connected to the current booster to separate the image signals into row image signals and field image signals; and
    a processing unit being connected to the central processing unit and the video separating unit, reading data in the storing fields in the memory and receiving the row image signals and the field image signals to align and superimpose graphical images representing ultrasonic waves from the coordinates in the storing fields in the memory on the images recorded by the video camera.

4. The vehicle backup detector as claimed in claim 3, wherein the video separating unit comprises
    a first integrating circuit being connected to the current booster to separate the row image signals from the image signals; and
    a second integrating circuit being connected to the first integrating circuit to separate the field image signals from the image signals.

5. The vehicle backup detector as claimed in claim 3, wherein the current booster comprises
    a first transistor having a base terminal, a collector terminal and an emitter terminal;
    a second transistor having
        a base terminal being connected to the video camera and the emitter terminal of the first transistor;
        a collector terminal; and
        an emitter terminal; and
    a third transistor having
        a base terminal being connected to the emitter terminal of the second transistor;
        a collector terminal being interconnected to the collector terminals of the first and second transistors; and
        an emitter terminal.

6. The vehicle backup detector as claimed in claim 4, wherein the current booster comprises
    a first transistor having a base terminal, a collector terminal and an emitter terminal;
    a second transistor having
        a base terminal being connected to the video camera and the emitter terminal of the first transistor;
        a collector terminal; and
        an emitter terminal; and
    a third transistor having
        a base terminal being connected to the emitter terminal of the second transistor;
        a collector terminal being interconnected to the collector terminals of the first and second transistors; and
        an emitter terminal.

7. The vehicle backup detector as claimed in claim 1 further comprising
    a multiplexer being connected to the ultrasonic transducers to receive and output the transducer signals in sequence as received; and
    an amplifying circuit being connected between the central processing unit and the multiplexer.

8. The vehicle backup detector as claimed in claim 7, wherein the amplifying circuit comprises
    a first operational amplifier receiving and amplifying the transducer signals output from the multiplexer and having
        a negative input terminal being connected to the multiplexer;
        an output terminal; and
        a positive input terminal;
    a band-pass filter eliminating noise adjacent to the transducer signals and comprising
        a second operational amplifier having
            a negative input terminal being connected to the output terminal of the first operational amplifier;
            an output terminal; and
            a positive input terminal;
        a filter resistor being connected between the negative input terminal and the output terminal of the second operational amplifier; and
        a filter capacitor being connected between the negative input terminal and the output terminal of the second operational amplifier; and a third operational amplifier amplifying the transducer signals again and sending the amplified transducer signals to the central processing unit and having
   a negative input terminal being connected to the output terminal of the second operational amplifier;
   an output terminal being connected to the central processing unit; and
   a positive input terminal.

9. The vehicle backup detector as claimed in claim 1 further comprising an alarm module connected to the central processing unit and comprising
   an alarm driving circuit; and
   a buzzer connected to the alarm driving circuit.

10. The vehicle backup detector as claimed in claim 1, wherein the memory is RAM in the central processing unit.

* * * * *